United States Patent [19]
Mukai

[11] Patent Number: 5,626,304
[45] Date of Patent: May 6, 1997

[54] APPARATUS FOR CONTROLLING TAPE TENSION

[75] Inventor: Masataka Mukai, Kanagawa, Japan

[73] Assignee: Sony Corporation, Tokyo, Japan

[21] Appl. No.: 136,940

[22] Filed: Oct. 18, 1993

[30] Foreign Application Priority Data

Oct. 21, 1992 [JP] Japan ................................. 4-283211

[51] Int. Cl.$^6$ ................................................ G11B 15/46
[52] U.S. Cl. ..................................... 242/334.6; 242/352.1
[58] Field of Search .......................... 242/334, 334.6, 242/352.1; 360/96.3, 73.04, 73.05, 73.11, 73.12, 73.14; 318/6, 7

[56] References Cited

U.S. PATENT DOCUMENTS

| | | | |
|---|---|---|---|
| 4,786,992 | 11/1988 | Tajima | 242/352.1 X |
| 4,807,107 | 2/1989 | Fincher | 242/334.6 X |
| 4,977,466 | 12/1990 | Nakata | 242/352.1 X |
| 5,032,936 | 7/1991 | Fujioka et al. | 242/334.6 X |
| 5,039,027 | 8/1991 | Yanagihara et al. | 242/334.6 X |
| 5,150,263 | 9/1992 | Sakamoto et al. | 360/73.04 X |
| 5,277,378 | 1/1994 | Ebisawa | 242/334.6 |
| 5,310,133 | 5/1994 | Falk et al. | 242/334.6 |
| 5,327,304 | 7/1994 | Owada et al. | 360/73.04 X |

*Primary Examiner*—John P. Darling
*Attorney, Agent, or Firm*—William S. Frommer; Alvin Sinderbrand

[57] ABSTRACT

When a reference tape tension is changed progressively from a current tape tension to a target tape tension, a tape tension can be made to approach the reference tape tension rapidly and reliably regardless of the magnitude of the difference between the current tape tension and the target tape tension. A tape servo apparatus detects a current tape tension, compares the detected current tape tension with the reference tape tension and regulates the tape tension in response to the comparison between the detected current tape tension and the reference tape tension while the reference tape tension is gradually changed from the current tape tension to the target tape tension, preferably, in a step-wise fashion. The current tape tension is thereby corrected so the system maintains the desired tape tension.

17 Claims, 5 Drawing Sheets

APPARATUS FOR CONTROLLING TAPE TENSION

BACKGROUND OF THE INVENTION

1. Field of the Invention

The present invention relates to a tape tension servo apparatus for use with a tape driving apparatus such as a video tape recorder (VTR) or the like.

2. Description of the Prior Art

There have heretofore been proposed tape tension servo apparatus which comprise a tape tension detecting means for detecting a tape tension, a tension comparing means for comparing a detected tape tension from the tape tension detecting means with a reference tape tension and a tape tension regulating means for regulating a tape tension in response to a compared output from the tension comparing means.

In the conventional tape tension servo apparatus, as shown in FIG. 1 of the accompanying drawings, when a reference tape tension is changed from a current tape tension N1 to a target tape tension N2, if there is a small difference therebetween, then a tape tension approaches the target tape tension N2 as shown by a broken curve a. After having passed the target tape tension N2 a little, the tape tension reaches the target tape tension N2 while being vibrated a little.

However, when the reference tape tension is changed from the current tape tension N1 to the target tape tension N2, if there is a considerably large difference therebetween, then the tape tension approaches the target tape tension N2 as shown by curve b in FIG. 1. After having passed the target tape tension N2 largely, the tape tension being vibrated considerably reaches the target tape tension N2 after a lot of time. As a consequence, when the reference tape tension is changed rapidly, the tape tension cannot follow the reference tape tension.

OBJECTS AND SUMMARY OF THE INVENTION

Therefore, it is an object of the present invention to provide an improved tape tension servo apparatus in which the aforesaid shortcomings and disadvantages encountered with the prior art can be eliminated.

More specifically, it is an object of the present invention to provide a tape tension servo apparatus by which a tape tension can follow a reference tape tension rapidly and reliably when the reference tape tension is changed from the current tape tension to the target tape tension even if there is a large difference therebetween.

It is another object of the present invention to provide a tape tension servo apparatus for use with a tape driving apparatus such as a video tape recorder.

According to a first aspect of the present invention, there is provided a tape tension servo apparatus for controlling a tension of a magnetic tape being guided along a predetermined tape path between a supply reel and a take-up reel. This tape tension servo apparatus is comprised of tension detecting means for detecting a current tension of the magnetic tape, comparing means for comparing the current tension with a target tension, tension regulating means for regulating the current tension in response to an output of the comparing means so that the current tension is regulated to approach the target tension, and control means for controlling the tension regulating means so that the current tension is gradually changed by a predetermined value in a step-wise fashion so as to approach the target tension.

According to a second aspect of the present invention, there is provided a tape tension servo apparatus which comprises a supply reel and a take-up reel for winding a magnetic tape thereon, the supply reel and the take-up reel being driven by a reel drive motor respectively so that the magnetic tape is transported between the supply reel and the take-up reel, a guide drum having at least one rotary head for recording and/or reproducing signals on and from the magnetic tape which is supplied from the supply reel and is wrapped around the guide drum, tension detecting means for detecting a current tension of the magnetic tape between the supply reel and the guide drum, torque calculating means for calculating a torque of the reel drive motor of the supply reel in accordance with an output of the comparing means and a diameter of a wrapped magnetic tape on the supply reel, tension regulating means for regulating the current tension in response to an output of the torque calculating means so that the current tension is regulated to approach the target tension, and control means for controlling the tension regulating means so that the current tension is gradually changed by a predetermined value in a step-wise fashion so as to approach the target tension.

According to a third aspect of the present invention, the reference tape tension is changed from the current tape tension to the target tape tension in a step-wise fashion.

According to the present invention, the reference tape tension is gradually changed (in a step-wise fashion) from the current tape tension to the target tape tension. Therefore, by properly selecting the degree of the change of the reference tape tension in consideration of a difference between the current tape tension and the target tape tension, characteristics of the tape driving apparatus and characteristics of the tension servo circuit, when the reference tape tension is changed from the current tape tension to the target tape tension, the tape tension can be approached to the reference tape tension rapidly and reliably even if there is a large difference therebetween.

The above and other objects, features, and advantages of the present invention will become apparent from the following detailed description of illustrative embodiments thereof to be read in conjunction with the accompanying drawings.

DETAILED DESCRIPTION OF THE PREFERRED EMBODIMENTS

The present invention will now be described in detail with reference to the drawings.

Figure 1:
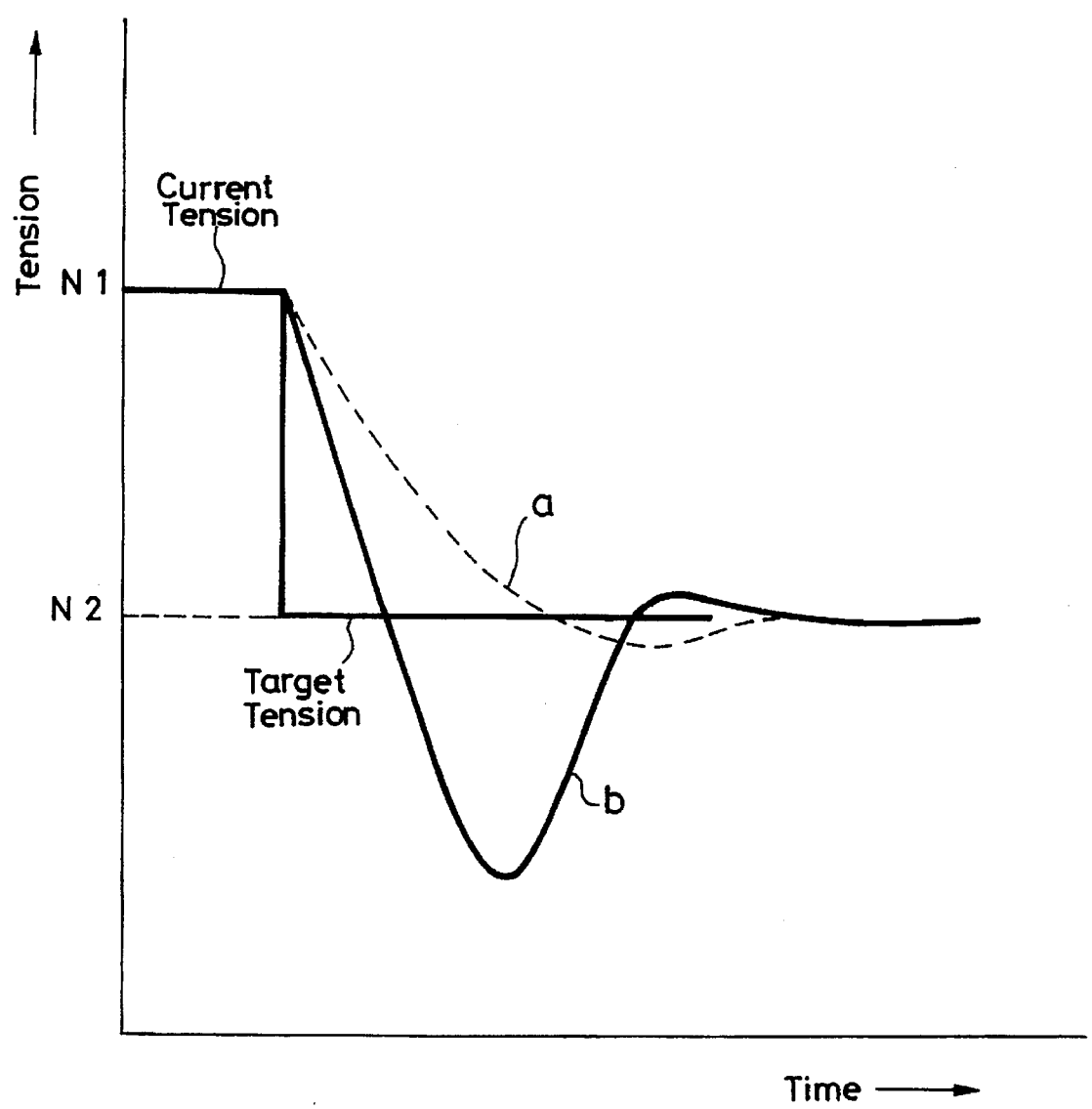
FIG. 1 is a diagram showing operation of a conventional tape tension servo apparatus.
Figure 2:
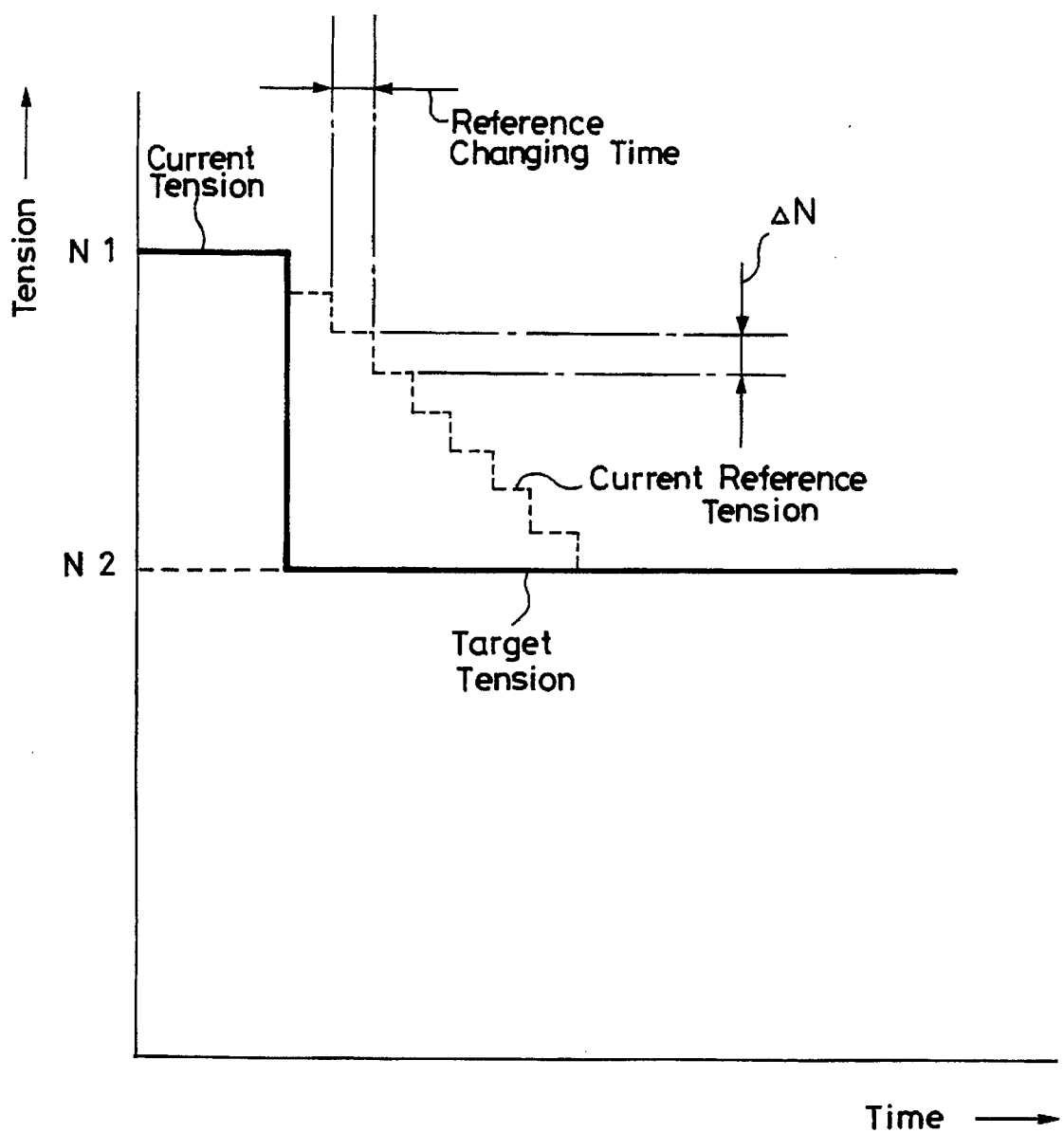
FIG. 2 is a diagram used to explain how to change a reference tape tension from a current tape tension to a target tape tension according to an embodiment of the present invention.

FIG. 2 is a diagram used to explain how to change a reference tape tension from a current tape tension to a target tape tension. More specifically, the reference tape tension is changed from the current tape tension by a step tape tension ΔN, i.e., the reference tape tension is lowered (or raised) at every target changing time until the target tape tension is attained. The reference changing time and the step tape tension ΔN are properly selected in consideration of a difference between the current tape tension and the target tape tension, characteristics of a tape driving apparatus, characteristics of a tension servo circuit, etc.

An example of a method of how to change the reference tape tension under the control of a CPU (central processing unit) will be described with reference to a flowchart forming FIG. 3.

Figure 3:
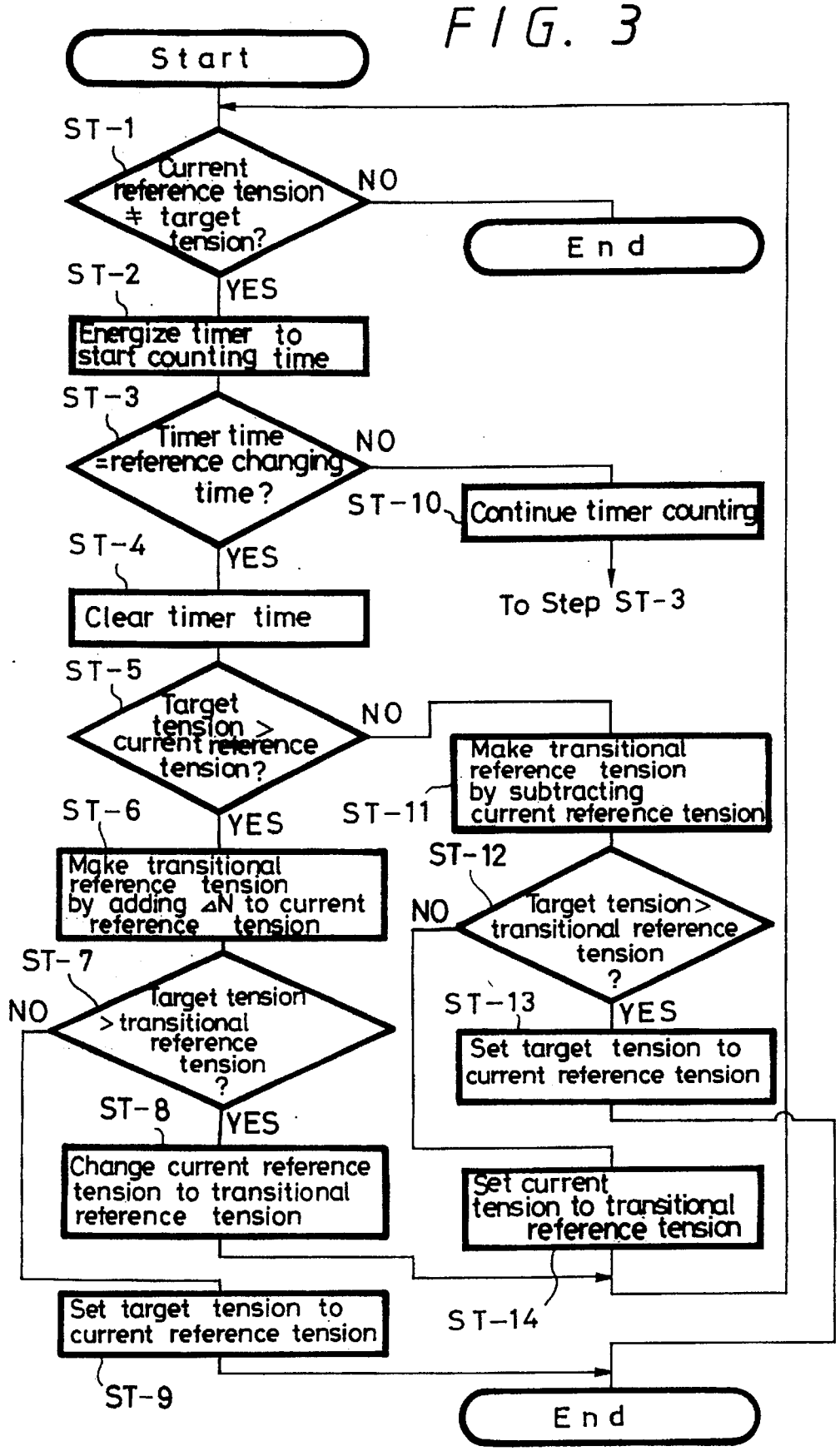
FIG. 3 is a flowchart to which references will be made in explaining operation of a tape tension servo apparatus according to the embodiment of the present invention.

Referring to FIG. 3, following the start of operation, it is determined in decision step ST-1 whether or not a current reference tape tension is not equal to a target tape tension. If a YES is output at decision step ST-1, then a processing proceeds to step ST-2. If on the other hand a NO is output at decision step ST-1, then the processing is ended. In step ST-2, a timer (not shown) is energized to count a time, and then the processing proceeds to the next decision step ST-3. It is determined in decision step ST-3 whether or not the timer time is equal to a reference changing time. If a YES is output at decision step ST-3, then the processing proceeds to step ST-4. If on the other hand a NO is output at decision step ST-3, then the processing proceeds to step ST-10. In step ST-10, the counting of time by the timer is continued and then the processing returns to decision step ST-3. In step ST-4, a timer time is cleared and then the processing proceeds to the next decision step ST-5.

It is determined in decision step ST-5 whether or not the current reference tape tension is smaller than the target tape tension. If a YES is output at decision step ST-5, then the processing proceeds to step ST-6. If on the other hand a NO is output at decision step ST-5, then the processing proceeds to step ST-11. Step ST-11 and the succeeding steps will be described later on.

In step ST-6, a transitional reference tension is made by adding the step tension ΔN to the current reference tension, and then the processing proceeds to the next decision step ST-7.

It is determined in decision step ST-7 whether or not the transitional reference tension is smaller than the target tension. If a YES is output at decision step ST-7, then the processing proceeds to step ST-8. If on the other hand a NO is output at decision step ST-7, then the processing proceeds to step ST-9.

In step ST-8, the current reference tension is changed to the transitional reference tension, and then the processing returns to step ST-1. In step ST-9, the target tension is set to the current reference tension, whereafter the processing is ended.

In step ST-11, the transitional reference tension is made by subtracting the step tension ΔN from the current reference tension, whereafter the processing proceeds to the next decision step ST-12. It is determined in decision step ST-12 whether or not the transitional reference tension is smaller than the target tension. If a YES is output at decision step ST-12, then the processing proceeds to step ST-13. If on the other hand a NO is output at decision step ST-12, then the processing proceeds to step ST-14. In step ST-13, the target tension is set to the current reference tension and then the processing is ended. In step ST-14, the current reference tension is set to the transitional reference tension, and then the processing returns to step ST-1.

Figure 4:
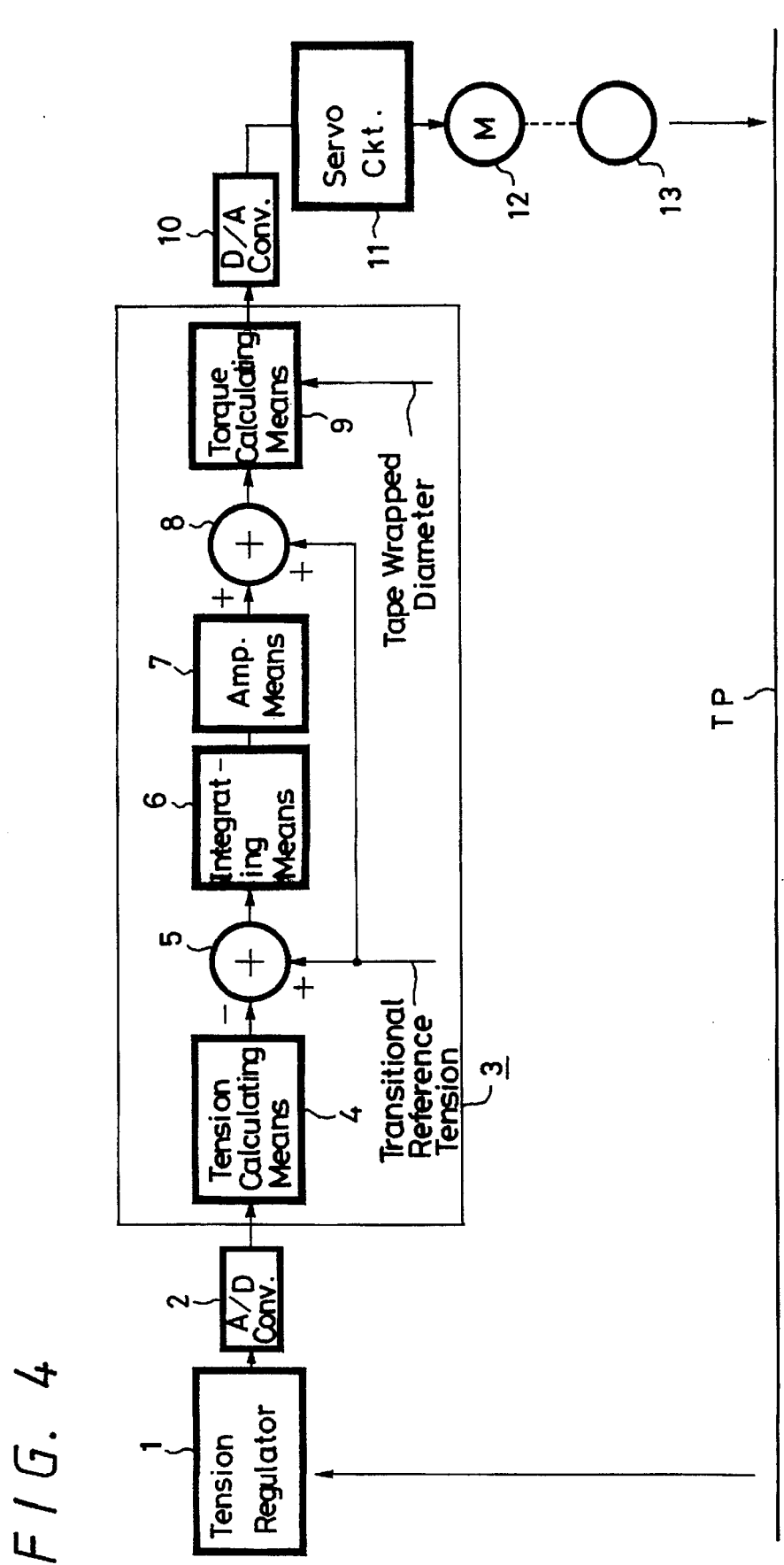
FIG. 4 is a block diagram showing a circuit arrangement of a tape tension servo circuit according to the embodiment of the present invention.

A tape tension servo circuit according to an embodiment of the present invention will be described below with reference to FIG. 4. As shown in FIG. 4, a supply reel 13 is rotated by a reel motor (M) 12 to apply a back tension to a magnetic tape TP. A tape tension applied to the magnetic tape TP from the supply reel 13 side is detected by a tension regulator 1. A detected output from the tension regulator 1 is supplied to an analog-to-digital (A/D) converter 2, in which it is converted into a digital signal and then supplied to a central processing unit (CPU) 3. A solid line circuit block 3 illustrates the functional block of the CPU 3, which will be described below.

A digital tension detected output from the A/D converter 2 is supplied to and calculated by a tension calculating means 4. Tension data that is a calculated result of the tension calculating means 4 is supplied to a comparing (or subtracting) means 5, in which it is subtracted from a transitional reference tape tension. This transitional reference tape tension is changed in a step-wise fashion. A subtracted result from the subtracting means 5 is supplied to and integrated by an integrating means 6. An integrated result from the integrating means 6 is amplified by an amplifying means 7 and then added to the transitional reference tape tension by a synthesizing means 8.

A torque calculating means 9 calculates torque data relative to a supply reel side reel motor 12 on the basis of an added output of the synthesizing means 8 and a diameter of a wrapped tape on the supply reel 13. The torque data from the torque calculating means 9 is supplied to a digital-to-analog (D/A) converter 10, in which it is converted into an analog signal and then supplied through a servo circuit 11 to the reel motor (M) 12 that rotates the supply reel 13.

Figure 5:
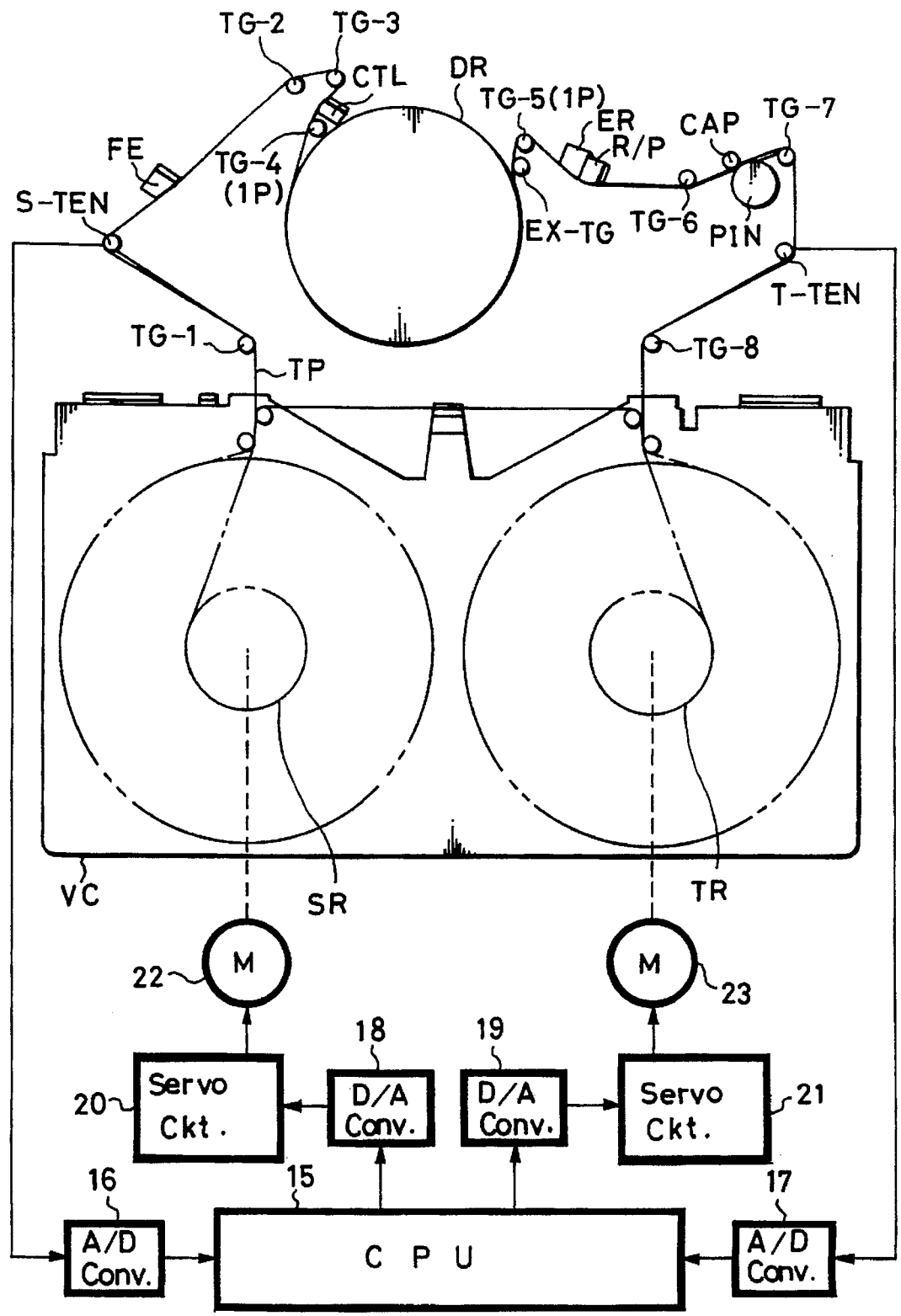
FIG. 5 is a diagram showing an arrangement of a tape driving apparatus according to another embodiment of the present invention.

A tape driving apparatus for driving a helical-scan type VTR according to another embodiment of the present invention will be described next with reference to FIG. 5. As shown in FIG. 5, there is provided a tape cassette VC of a video tape cassette in which there are housed a supply reel SR and a take-up reel TR. The supply reel SR and the take-up reel TR are rotated by reel motors (M) 22, 23, respectively.

A magnetic tape TP supplied from the supply reel SR is transported through a tape guide TG-1, a supply-reel side tension regulator S-TEN, a full-width erase magnetic head FE, a tape guide TG-2, a tape guide TG-3, a CTL (control) recording/reproducing magnetic head CTL and a tape guide TG-4 (1P), in that order, and then wrapped around a tape guide drum device DR. The magnetic tape TP detached from the tape guide drum device DR is transported through a tape guide EX-TG, a tape guide TG-5 (1P), an audio signal erase magnetic head ER, an audio signal recording/reproducing magnetic head R/P, a tape guide TG-6, a capstan CAP, a pinch roller PIN, a tape guide TG-7, a tension regulator T-TEN of the take-up reel TR side and a tape guide TG-8, in that order, and then wrapped around the take-up reel TR.

Detected outputs from the two tension regulators S-TEN, T-TEN are respectively supplied to A/D converters 16, 17, in which they are converted into digital signals and then supplied to a CPU 15 that constructs a system control apparatus. A digital back tension torque signal and a winding torque signal from the CPU 15 are supplied to D/A converters 18, 19, in which they are respectively converted into analog signals. These analog signals are supplied through servo circuits 20, 21 to the supply reel side reel motor (M) 22 and the take-up reel side reel motor (M) 23, respectively. The above-mentioned capstan CAP also is operated under the control of the CPU 15, though not shown. Further, the CPU 15 is adapted to control respective sections of this tape driving apparatus in order to effect various operations such as recording, reproducing, fast forward, rewind, variable speed playback or the like in response to input signals entered by mode operation buttons (not shown).

Arrangements of the above-mentioned embodiments shown in FIGS. 2 to 4 are applied to the tape driving apparatus shown in FIG. 5. In that case, the tension regulator 1 on the supply reel side shown in FIG. 4 corresponds to the supply reel side tension regulator S-TEN shown in FIG. 5, the A/D converter 2 shown in FIG. 4 corresponds to the A/D converter 16 shown in FIG. 5, the CPU 3 shown in FIG. 4 corresponds to a part of the CPU 15 shown in FIG. 5, the D/A converter 10 shown in FIG. 4 corresponds to the D/A converter 18 shown in FIG. 5, the supply reel side reel motor 12 shown in FIG. 4 corresponds to the supply reel side reel motor 22 shown in FIG. 5, and the supply reel 13 shown in FIG. 4 corresponds to the supply reel SR shown in FIG. 5, respectively. The supply reel side servo circuit 11 shown in FIG. 4 corresponds to the servo circuit 20 shown in FIG. 5.

While the transitional reference tape tension is progressively changed from the current tape tension to the target tape tension in a step-wise fashion as described above, the present invention is not limited thereto and the following variants are also possible. That is to say, an angle of the steps may be blunted or the step-wise change may be a gentle curve that approaches from the current tape tension to the target tape tension.

According to the present invention, there can be obtained a tape tension servo apparatus by which a tape tension can follow a reference tape tension rapidly and reliably when the reference tape tension is changed from the current tape tension to the target tape tension even if there is a large difference therebetween. Incidentally, when the reference tape tension is changed from the current tape tension to the target tape tension in a step-wise fashion, the control operation can be made very easy.

Having described preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

What is claimed is:

1. A tape tension servo apparatus for maintaining a desired target tension of a magnetic tape which is guided along a predetermined tape path between a supply reel and a take-up reel, comprising:

tension detecting means for detecting a current tension of said magnetic tape in said tape path;

means for providing a transitional reference tension which is in the region intermediate the detected current tension and the target tension;

control means for periodically varying said transitional reference tension so as to approach said target tension;

comparing means for comparing said detected current tension with said transitional reference tension; and tension regulating means for regulating said current tension in response to an output of said comparing means so that said current tension is regulated to approach said target tension.

2. The tape tension servo apparatus according to claim 1, further comprising analog-to-digital converting means for converting said detected current tension from an analog signal to a digital signal.

3. The tape tension servo apparatus according to claim 1, wherein said tension detecting means is a tension regulator.

4. The tape tension servo apparatus according to claim 1, further comprising tension calculating means for calculating a detected output of said tension detecting means.

5. The tape tension servo apparatus according to claim 4, wherein said comparing means is a subtracter for subtracting a calculated result of said tension calculating means from said transitional reference tension.

6. The tape tension servo apparatus according to claim 1, wherein said tension regulating means is a supply reel and a take-up reel having a magnetic tape wound thereon.

7. The tape tension servo apparatus according to claim 1, wherein said control means is a central processing unit.

8. The tape tension servo apparatus according to claim 7, wherein said central processing unit is comprised of:

said tension calculating means;

said subtracter;

integrating means for integrating an output of said comparing means;

amplifying means for amplifying an output of said integrating means;

synthesizing means for adding an output of said amplifying means and said transitional reference tension; and torque calculating means for calculating a torque of a reel drive motor of said supply reel in accordance with an output of said comparing means and a diameter of a wrapped magnetic tape on said supply reel.

9. The tape tension servo apparatus according to claim 8, further comprising:

a servo circuit for controlling said reel drive motor of said supply reel; and digital-to-analog converting means for converting a digital output of said torque calculating means into an analog signal which is input to said servo circuit.

10. The tape tension servo apparatus according to claim 1, wherein a torque calculating means calculates a torque of a reel drive motor of said supply reel in accordance with an output of said comparing means and a diameter of a wrapped magnetic tape on said supply reel.

11. A tape tension servo apparatus according to claim 10, further comprising a guide drum having at least one rotary head for recording and/or reproducing signals on and from said magnetic tape which is supplied from said supply reel and is wrapped around said guide drum.

12. The tape tension servo apparatus according to claim 11, wherein said comparing means, said torque calculating means and said control means are formed of a central processing unit.

13. The tape tension servo apparatus according to claim 11, wherein said tension regulating means are servo circuits.

14. A tape tension servo apparatus according to claim 1, wherein said control means varies said transitional reference tension by a predetermined increment so as to approach said target tension in a step by step fashion.

15. A tape tension servo apparatus according to claim 14, wherein said control means sets said target tension to a current reference tension when a change in said transitional reference tension by said predetermined increment would displace said transitional reference tension outside the region intermediate said detected current tension and said target tension.

16. A method for maintaining a desired target tension of a magnetic tape which is guided along a predetermined tape path between a supply reel and a take-up reel, including the steps of:

detecting a current tape tension of said magnetic tape in said tape path;

providing a transitional reference tension which is in the region intermediate the detected current tension and the target tension;

periodically varying said transitional reference tension so as to approach said target tension;

comparing said detected current tension with said transitional reference tension; and regulating said current tension in response to an output of the comparison between said detected current tension and said transitional reference tension so that said current tension is regulated to approach said target tension.

17. A method according to claim 16, wherein said transitional reference tension is varied by a predetermined increment so as to approach said target tension in a step by step fashion.

* * * * *